INVENTORS—
Richard C. Slawinski &
William Meyer
BY Richards and Cifelli,
Attorneys—

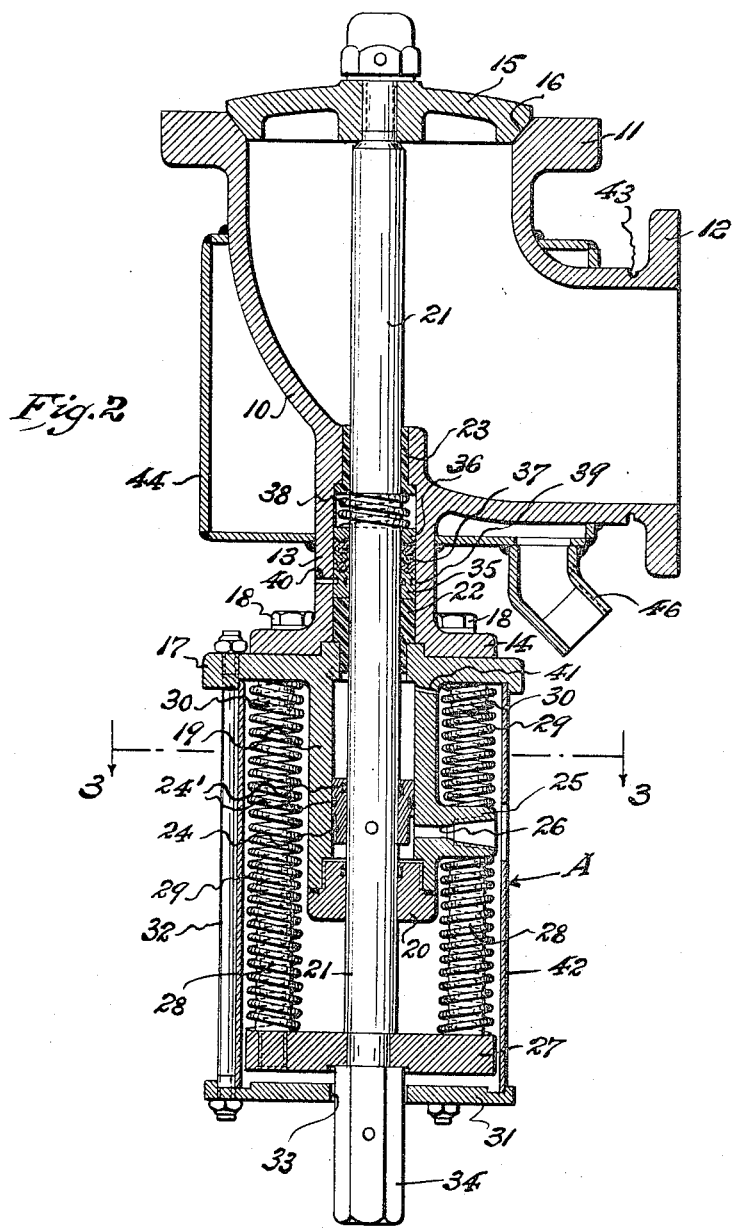

United States Patent Office 3,332,660
Patented July 25, 1967

3,332,660
HYDRAULIC EMERGENCY VALVE
Richard C. Slawinski, Murray Hill, and William Meyer, East Orange, N.J., assignors to Wheaton Brass Works, Union, N.J., a corporation of New Jersey
Filed May 14, 1964, Ser. No. 367,475
3 Claims. (Cl. 251—14)

This invention relates to improvements in emergency valves adapted to control discharge of oil, gasoline, or a chemical or other liquid from a tank, and especially from a transportation truck tank. Such emergency valves are provided with means to open the same for liquid discharge from the tank to which they are attached, and are so designed as to include means to automatically close the same against liquid discharge in the event the truck tank is involved in a traffic accident, resulting in damage to the discharge piping leading from the valve, or in truck overturn or the like.

It is an object of this invention to provide a novel and improved emergency valve structure, preferably of the elbow type, the liquid flow passage of which can be easily cleaned, and wherein the means for opening the valve, and the means for automatically closing the same, under emergency conditions, are located exteriorly of the valve flow passage, so that merely the stem of the valve member extends through said flow passage, thus providing but minimum obstructive or restrictive resistance to the flow stream discharged through the valve.

Another object of the invention is to provide an improved construction of hydraulically actuated valve opening means, including sealing means to prevent access of hydraulic fluid to the liquid flow passage of the valve, and further including operating and maintenance signal means by which either leakage of the carried liquid from the tank or leakage of the valve actuating hydraulic fluid is visibly indicated in event of any by-passing of said sealing means by either said liquid or fluid.

A further object of this invention is to provide an improved spring pressure exerting means operative to close the valve in the event of emergency; said spring means comprising a plurality of compression springs, so that high closing pressure is exerted thereby upon the valve, without undue build up of pressure when the valve is open.

Another object of this invention is to provide the hydraulically actuated valve opening means with visible means to quickly indicate, at a glance, the respective open or closed condition of the valve, as the case may be; said means also serving as an emergency means for application of force to the valve, independent of the hydraulic means, to open the valve in event of failure of said hydraulic actuating means.

Still another object of this invention is to provide the elbow formation of the valve with a shear section to furnish a frangible connection between said formation and discharge piping connected therewith, to permit the breaking away of the latter from the former in the event of emergency.

Optionally, the elbow formation of the valve may be enclosed in a steam circulating jacket.

The above, and other objects of this invention not at this time more particularly enumerated, will be understood from the following description of an illustrative embodiment of this invention, when read in connection with the accompanying drawings thereof, in which drawings:

FIG. 2 is a longitudinal sectional view of the valve of this invention, taken on line 2—2 in FIG. 1, and drawn on an enlarged scale.

Like characters of reference are employed in the above described views, to indicate corresponding parts of the valve structure.

Figure 1:
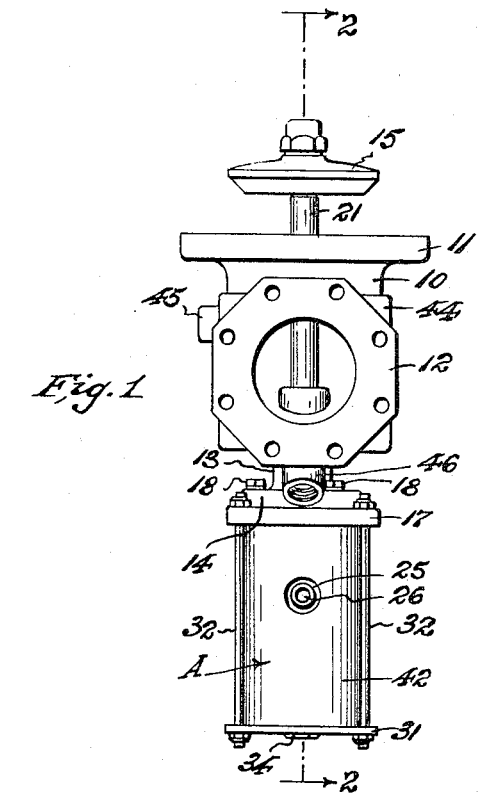
FIG. 1 is an elevational view, observed toward the discharge end of the valve of this invention, and showing the valve in open condition.
Figure 3:
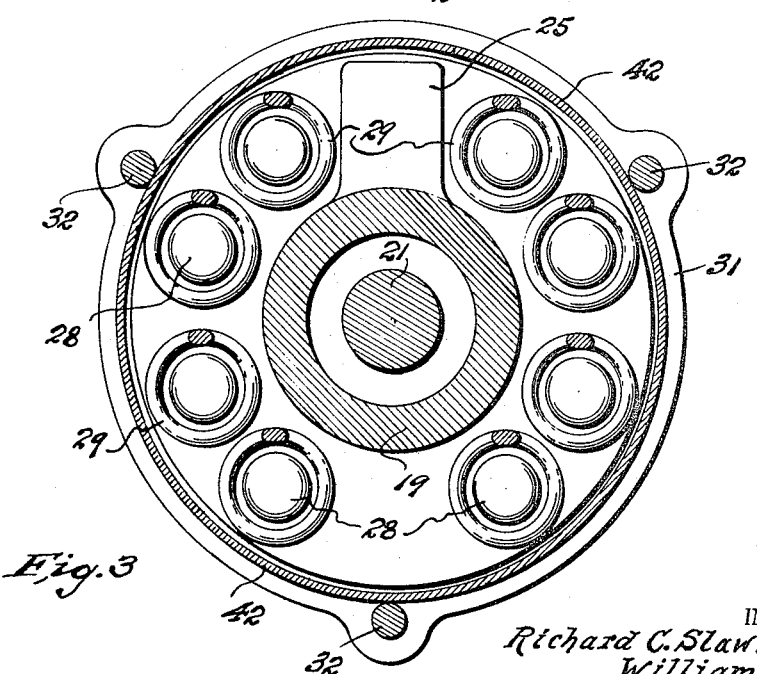
FIG. 3 is a horizontal sectional view, taken on line 3—3 in FIG. 2, and drawn on a further enlarged scale.

Referring to said drawings, the reference character 10 indicates an emergency valve body according to this invention, which is preferably of elbow formation, but in any event includes the main flow passage of the valve. The perpendicular intake end of said valve body is provided with an external flange 11 adapted to abut the bottom wall of the tank (not shown), for suitable operative attachment thereto in communication with the tank interior. The horizontal discharge end of the valve body 10 is also provided with an external flange 12, to which discharge piping (not shown) can be suitably connected.

Dependent from the underside of the valve body 10, in axial alignment with the intake end thereof, is a gland 13. This gland can be connected in any suitable manner with the valve body, but preferably is an integral part thereof, the same terminating at its bottom end in an external flange 14.

Suspended from the bottom flange 14 of gland 13 is means for effecting controlled opening and automatic closing actuation of a valve member 15 which, in closed condition, engages, in metal to metal lapped contact, with a ground seat 16 that surrounds the intake end of the valve body 10; this actuating means generally indicated by the reference character A, being thus dependent from said valve body 10 entirely outside thereof, so that only the upper end portion of the plunger shaft (hereinafter described) by which the valve member 15 is carried, extends across the discharge passage of said valve body 10, and consequently but minimum obstructive or restrictive resistance to the flow stream of liquid discharged through the valve body is offered.

Said means for effecting opening and closing actuation of the valve member 15 comprises a top plate 17, which is affixed to the gland flange 14 by bolts 18 or other suitable fastening means. Dependent from said top plate 17, in axial alignment with the gland 13, is a cylinder member 19. This cylinder member communicates, at its upper end, with the passage of gland 13, and is closed at its lower end by a closure cap or head 20. Slidably extending through said closure cap or head 20, and thence upwardly through the cylinder member 19, gland 13 and the valve body interior, is a plunger shaft or valve stem 21, to the upper end of which the valve member 15 is suitably affixed. Intermediate the gland 13 and cylinder member 19 is mounted a bearing bushing 22 by which the plunger shaft 21 is slidably supported, and additionally mounted in the upper end portion of gland 13 is another bearing bushing 23 by which the plunger shaft is also slidably supported. These bearing bushings 22 and 23 are preferably made of a self-lubricating material, known to the trade as Teflon. Affixed to the plunger shaft 21, so as to be slidably movable in the cylinder member 19, is a piston member 24. This piston member is provided with suitably arranged and disposed seal rings 24 to cooperate with the walls of the cylinder member 19 and the surface of the plunger shaft 21. Communicating with the lower end of the cylinder member interior, below the piston member 24, is a hydraulic fluid intake means 25, to the flow passage 26 of which can be suitably connected hydraulic fluid delivery means (not shown).

Affixed to the lower end portion of the plunger shaft 21, in downwardly spaced away relation to the cylinder member 19, is a foot plate 27, the same having a plurality of upstanding studs 28 which are disposed in outward radially offset relation to the plunger shaft, and in circumferentially spaced apart relation, one to another, around the latter and adjacent to opposite sides of the cylinder member 19. Footed upon said foot plate 27, and positioned by the respective studs 28, are a plurality of compression springs 29. The upper ends of said springs backed and supported by the top plate 17, being positioned in connection therewith by studs 30 which depend from said top plate. It will be understood that the number of said springs 29 may be varied, the desideratum being that the effective tension thereof be distributed and applied at various points around the plunger shaft, so that high closing thrust can be exerted thereby upon the valve, without undue build up of pressure when the valve is open. As shown, in a desirable arrangement thereof, eight said springs 29 are provided, the same being operative, under proper circumstances and when under compression, to exert down thrusting pressure upon the foot plate 27 and the plunger shaft, whereby to move the valve member 15 from open to closed condition when opening pressure of hydraulic fluid is released or interrupted.

At its lower end, the means for effecting opening and closing actuation of the valve member 15 is provided with a bottom plate 31, which is suspended from and connected with the top plate 17 by tie-rods 32. Said bottom plate 31 is provided with a central opening 33, and connected with the lower end of the plunger shaft 21 is an extension 34 thereof, which, when the valve member 15 is closed relative to the valve body 10, projects exteriorly of the bottom plate 31, so as to be visible and thereby to indicate that the emergency valve is closed (see FIG. 2). When the valve member 15 is moved to open the intake end of the valve body 10, by ascending movement of the plunger shaft 21, said extension 34 of the latter is withdrawn upwardly through the bottom plate opening 33, so as to be concealed, and thus to indicate the open condition of the emergency valve.

Disposed within the gland 13, between the respective bearing bushings 22 and 23 and around the plunger shaft 21, is a barrier seal means operative to normally prevent by-passing of liquid from the emergency valve into the cylinder member 19 or of hydraulic fluid from the latter into the former. This seal means can be varied in detail structure, but preferably comprises a rigid bottom ring 35 footed upon the bearing bushing 22, and a rigid top ring 36 axially spaced upwardly from said bottom ring. Intermediate said bottom and top rings 35 and 36 are a series of superposed compressible packing rings 37. Disposed between the top ring 36 and the bearing bushing 23 is a compression spring 38. This spring 38 exerts downward tensional thrust upon the barrier seal assembly, whereby to compress the packing rings 37 so as to force the same into sealing engagement with the walls of the glands 13 and the surface of the plunger shaft 21.

Said barrier seal means is provided with signal means by which any leakage of liquid discharged through the emergency valve, or of hydraulic fluid from the cylinder member 19, which by-passes the barrier seal means, can be visibly indicated, and thereupon prevented, whereby to maintain the emergency valve in proper operating condition. To this end, the bottom ring 35 of the barrier seal assembly is provided with an annular channel 39 which communicates with a bleed port 40 that extends outwardly through the wall of the gland 13 to the exterior thereof. It will be obvious that any liquid or fluid, which by-passes the barrier seal, will be discharged exteriorly of the gland 13, so as to be readily visible to indicate occurrence of leakage.

Provided in the wall of the cylinder member 19 is a breather port to establish communication between the upper interior of the cylinder member chamber and the atmosphere. This port 41 may also serve as additional signal means to indicate any leakage of hydraulic fluid which may by-pass the piston member 24.

Preferably, the springs 29 of the means for effecting closing movement of the valve member 15 are enclosed within a surrounding cylindrical casing or cover 42, which is supported by and between the top and bottom plates 17 and 31 of said valve member activating means.

In use and operation of the emergency valve of this invention, when it is required to open the same, for discharge of liquid from a tank served thereby, hydraulic fluid is delivered, through the passage 26 of the intake means 25, into the lower end of the cylinder member 19 beneath the piston member 24. The pressure of this admitted hydraulic fluid upon the piston member 24 moves the latter, and the plunger shaft 21, upwardly. The upward movement of the plunger shaft is transmitted to the valve member 15, thus lifting the same to open relation to the intake end of the valve body 10 (see FIG. 1). The upward movement of the plunger shaft also raises the foot plate 27, thus compressing the springs 29 to tensioned condition. When hydraulic fluid pressure is released, or interrupted due to occurrence of abnormal emergency conditions, the tensioned springs 29, thrusting downwardly against the foot plate 27, exert down-moving thrust upon the plunger shaft 21, thus lowering the valve member 15 into closed relation to the intake end of the emergency valve body 10 (see FIG. 2).

In the event of closing of the emergency valve due to abnormal conditions, it is desirable to provide the emergency valve with means to facilitate breaking away therefrom any liquid discharge piping connected therewith. To promote this, the outlet end portion of the valve body 10 is provided with a weakened shear means, comprising an external annular groove 43 which suitably weakens the walls of said outlet end portion of the valve body 10.

When the emergency valve is connected with a tank containing some types of chemical liquids, it may be desirable to enclose the valve body 10 in a jacket chamber 44, through the interior of which steam or other tempering fluid can be circulated. Said jacket chamber 44 is normally provided with a tempering fluid intake means 45 and a discharge means 46.

Although a specific embodiment of this invention has been shown in the accompanying drawings and above described, it will be understood that modifications in construction and arrangement of the parts thereof may be made within the scope of this invention as defined by the following appended claims.

What is claimed is:

1. An emergency valve for discharging liquid from a tank to which its intake end is connected, said valve comprising a valve body, a valve member to close the intake end of said valve body, a valve stem operative to open and close said valve member, a gland depending exteriorly from the valve body, said valve stem extending downwardly through said valve body and dependent gland and externally thereof, and valve member actuating means suspended from the gland and thus entirely outside the valve body for cooperation with the lower exterior end portion of said valve stem, whereby to reciprocate said valve stem to open and close the valve member, said actuating means comprising a cylinder member affixed to and extending from the gland in axial alignment therewith and through which the lower end of the valve stem passes, a piston member affixed to the valve stem and slidable within the cylinder member, means for delivering hydraulic fluid into the cylinder member below the piston member, whereby to raise the valve stem to open said valve member, said cylinder member having a radially projected top plate connected therewith, a radially projected foot plate affixed to said valve stem in downwardly spaced away relation to the cylinder member, and a plurality of compression springs circumferentially spaced around said cylinder member and valve stem and engaged between said top plate and foot plate, said springs being tensionally compressed by upward valve member opening movement of the valve stem, whereby cumulative tensional thrust of said springs is operative to lower said valve stem to close the valve member, when valve member opening hydraulic pressure applied to the valve stem is released or interrupted by occurrence of abnormal emergency conditions, and a bottom plate suspended from the top plate below said foot plate and having a central opening, the valve stem having an extension movable through said bottom plate opening, whereby to be withdrawn upwardly through the bottom plate and concealed to indicate open condition of the valve member and to be projected interiorly through said bottom plate to visibly indicate closed condition of the valve member, said extension being of sufficently sturdy construction to permit application of axial force thereto to overcome the closing force of said springs and open said valve independently of said hydraulic actuating means.

2. An emergency valve according to claim 1, wherein a barrier seal means is supported within the gland around the valve stem, and said gland being provided with a bleed port extending outwardly through its wall from the barrier seal means, to visibly emit liquid or fluid tending to by-pass the barrier seal, whereby to signal leakage thereof.

3. An emergency valve according to claim 1, wherein the wall of the cylinder member is provided, at its upper end, with a breather and bleed port.

References Cited
UNITED STATES PATENTS

| | | | |
|---|---|---|---|
| 1,652,510 | 12/1927 | Allen | 251—144 |
| 2,278,721 | 4/1942 | Jones | 251—214 X |
| 2,342,001 | 2/1944 | Magnuson | 251—62 X |
| 2,395,212 | 2/1946 | Blanchard et al. | 251—62 X |
| 2,693,822 | 11/1954 | Gerow et al. | 251—62 X |
| 2,787,126 | 4/1957 | Kleczek | 251—62 X |
| 2,859,765 | 11/1958 | Streed | 251—144 X |
| 2,953,345 | 9/1960 | Slemmons et al. | 251—62 X |
| 3,065,949 | 11/1962 | Defrees | 251—62 |
| 3,086,745 | 4/1963 | Natho | 251—62 |
| 3,139,285 | 6/1964 | Dumm | 251—62 X |
| 3,226,078 | 12/1965 | Anderson | 251—62 |

M. CARY NELSON, *Primary Examiner.*

S. SCOTT, *Assistant Examiner.*

UNITED STATES PATENT OFFICE
CERTIFICATE OF CORRECTION

Patent No. 3,332,660                                    July 25, 1967

Richard C. Slawinski et al.

It is hereby certified that error appears in the above numbered patent requiring correction and that the said Letters Patent should read as corrected below.

Column 5, line 9, for "interiorly" read -- exteriorly --.

Signed and sealed this 19th day of November 1968.

(SEAL)
Attest:

Edward M. Fletcher, Jr.                                 EDWARD J. BRENNER
Attesting Officer                                         Commissioner of Patents